(12) United States Patent
Case

(10) Patent No.: US 9,225,819 B2
(45) Date of Patent: Dec. 29, 2015

(54) CHARACTER ANALYSIS ENGINE IN MOBILE COMPUTING DEVICE FOR FACILITATING INTERACTIVE VOICE RESPONSE OPERATIONS

(75) Inventor: David Case, Manalapan, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 1406 days.

(21) Appl. No.: 12/621,057

(22) Filed: Nov. 18, 2009

(65) Prior Publication Data

US 2011/0117891 A1    May 19, 2011

(51) Int. Cl.
*H04M 3/42* (2006.01)
*H04M 1/725* (2006.01)
*G10L 15/26* (2006.01)
*H04M 1/2745* (2006.01)

(52) U.S. Cl.
CPC ........... *H04M 1/72552* (2013.01); *G10L 15/26* (2013.01); *H04M 1/72519* (2013.01); *H04M 1/2745* (2013.01)

(58) Field of Classification Search
CPC .................................. H04W 4/16; H04W 4/12
USPC ...................................................... 455/414.1
See application file for complete search history.

(56) References Cited

U.S. PATENT DOCUMENTS

| | | | |
|---|---|---|---|
| 2007/0049261 A1* | 3/2007 | Joglekar | 455/416 |
| 2007/0121909 A1* | 5/2007 | Schnurr | 379/355.01 |
| 2008/0165948 A1* | 7/2008 | Ryals et al. | 379/266.1 |

* cited by examiner

*Primary Examiner* — Omoniyi Obayanju
(74) *Attorney, Agent, or Firm* — Kilpatrick Townsend Stockton LLP

(57) ABSTRACT

A system and a method are disclosed for facilitating sending of DTMF (dual-tone multi-frequency) signals to a destination after connecting to a system by placing a phone call. An entry associated with an application running on a mobile computing device is automatically scanned to detect a telephone number and any string of characters associated with the telephone number. The mobile computing device presents one or more candidate strings of characters that are associated with the telephone number. A user may select the strings of characters to send the DTMF signals after connecting to a destination telephone system. By automatically extracting and displaying the string of characters associated with the telephone number, the user's manual operation associated with accomplishing a task on a remote telephone system is minimized.

9 Claims, 8 Drawing Sheets

CHARACTER ANALYSIS ENGINE IN MOBILE COMPUTING DEVICE FOR FACILITATING INTERACTIVE VOICE RESPONSE OPERATIONS

BACKGROUND

1. Field of Art

The disclosure generally relates to the field of facilitating telephonic connections and subsequent operations on a mobile computing device.

2. Description of Art

Mobile computing devices are becoming more popular with expansion of their functionality and capability. Mobile computing devices currently available on the market come equipped with telecommunication functionality for making data or voice connections as well as computing capability for executing various applications. Widely used applications executed on the mobile computing devices include applications for managing emails, schedules and contact information. Also, more mobile computing devices are now equipped with cameras that allow taking of pictures and GPS (Global Positioning System) sensors that track its location. Various applications are developed and available to take advantage of such hardware capabilities. Such additional functionality and capability are contributing to wide popularity of mobile computing devices.

As such functionality and capability of the mobile computing devices expand, a user may need to switch between applications more often to perform an operation. On smartphones, one of the most often used functionalities is placing a phone call to a destination. Typical users cannot remember a long sequence of numbers. Hence, unless a user writes down all the information for accessing a service, the user may have to switch between a phone application and other applications to retrieve and enter all the information to successfully connect to a destination and access a service. Information for accessing the service, other than the telephone number, may include: passwords, call bridge numbers, account numbers, PIN numbers, and any combinations thereof. The need to switch between applications may extend the time required to perform a task and irritate the user.

Assume that a user is placing a phone call to a phone conference center based on a telephone number included in an email. In order to access the phone conference center, the user must first dial a telephone number and then manually enter a call bridge number and/or password that may also be included in the email. After dialing, the user must switch to an email application to confirm the correct bridge number and/or password necessary to access the phone conference service unless the user memorizes or writes down the call bridge number and/or password. Similarly, when connecting to a destination via a PBX (private branch exchange) based on information available from a contact application, a user needs to place a phone call to a destination and then manually enter a correct extension number to reach the destination. If the user does not remember the extension number, the user must switch back to the contact application to confirm the extension number and then return to the phone application to manually enter the correct extension number. Each of these processes is time consuming and cumbersome.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Embodiments relate to a disclosed system, method and computer readable storage medium that facilitates sending DTMF (dual-tone multi-frequency) signals to a destination telephone system after connecting to the telephone system by placing a phone call. An entry associated with an application running on a mobile computing device is automatically scanned to detect a telephone number and any string of characters associable with the telephone number. The mobile computing device presents one or more candidate strings of characters for selection. A user may select the strings of characters to send the DTMF signals corresponding to the string of characters to a destination telephone system. The user need not memorize or write down the strings of characters to accomplish the call because the mobile computing device automatically presents the strings of characters for selection to the user.

The characters described herein include alphanumeric characters, special function characters and characters representing foreign languages. Example characters include numbers, alphabets, star (*) sign and pound (#) sign. In one embodiment, each character has at least one corresponding DTMF signal.

Example Architecture of Telephone System

Figure 1A:
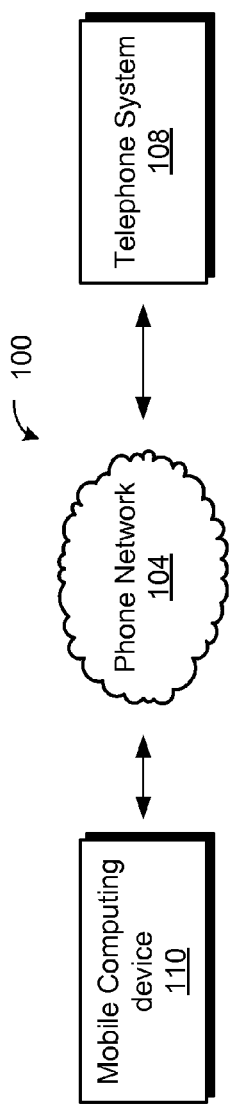
FIG. 1A is a system diagram illustrating a remote access system, according to one embodiment.

FIG. 1A is a system diagram illustrating a remote access system 100, according to one embodiment. The remote access system 100 may include, among other components, a mobile computing device 110, a phone network 104, and a telephone system 108. The mobile computing device 110 accesses the phone network 104 via a wireless or wired phone network 104 to the telephone system 108. The mobile computing device 110 has telephonic functionality to connect to a remote destination (e.g., the telephone system 108). Example mobile computing device 110 includes a mobile phone, a smartphone, a netbook computer, a laptop computer and a game console.

The phone network 104 is a combination of network components for switching phone connections between multiple devices. The telephone network 104 may include, among others, a public switched telephone network (PSTN), a cellular network and Internet. The telephone network 104 may transmit data between the mobile computing device 110 and the telephone system 108 using analog signals or digital signals. The telephone network 104 may use various communication protocols and switching mechanism to connect calls.

The telephone system 108 is a phone system that is at least partially automated to perform functions based on signals received from the mobile computing device 110. The telephone system 108 may be an IVR (interactive voice response) system that can be operated by DTMF (dual-tone multiple-frequency) signals or other signals received from the mobile computing device 110 via the phone network 104. The telephone system 108 may include, among others, a PBX (private branch exchange), a voicemail system, a banking system, and a teleconference system.

In the following, the mobile computing device 110 is described primarily with reference to a mobile computing device having telephonic functionality ("smartphone") communicating with the phone network 104 via wireless communication for the sake of convenience. Various other types of mobile computing devices may also be employed in the remote access system 100. Also, although only one mobile computing device 110, and one telephone system 108 are illustrated in FIG. 1A, in practice, there will be multiple mobile computing devices 110 and telephone systems 108. Further, the mobile computing device 110 may also communicate with multiple telephone networks. In one embodiment, the mobile computing device 110 selects one telephone network from multiple phone networks based on their availability. For example, the mobile computing device 110 may connect to the telephone system 108 via a first phone network (e.g., the Internet via a Wi-Fi network) when the first phone network is available but connect to the telephone system 108 via a second phone network (e.g., a cellular network) when the first phone network is not available.

Example Mobile Computing Device

Figure 1C:
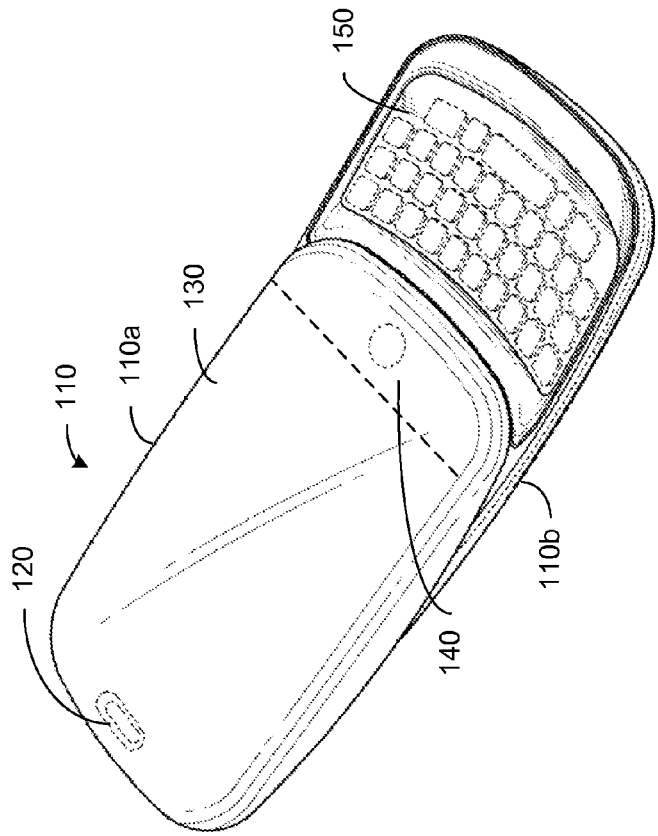
FIG. 1C is a diagram illustrating the mobile computing device of FIG. 1B in an open state.
Figure 1B:
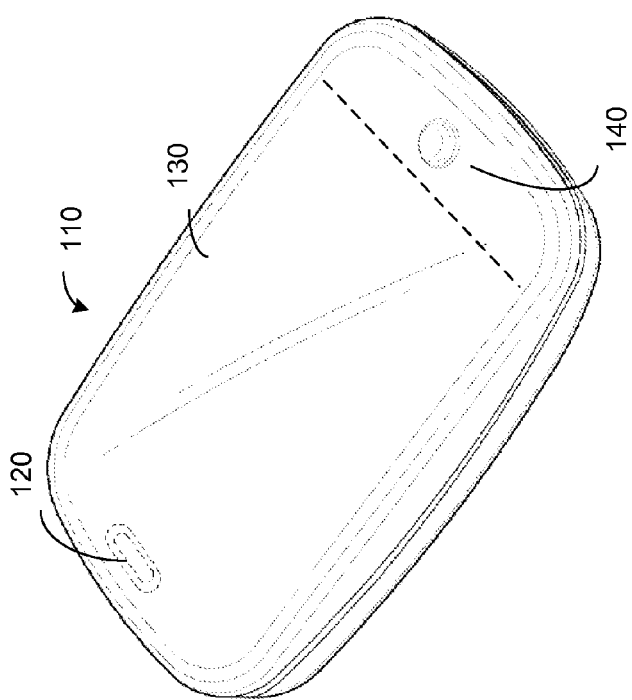
FIG. 1B is a diagram illustrating a mobile computing device in a closed state, according to one embodiment.

FIGS. 1B and 1C illustrate one embodiment of a mobile computing device 110. FIG. 1B illustrates one embodiment of a first positional state of the mobile computing device 110 having telephonic functionality, e.g., a mobile phone or smartphone. FIG. 1C illustrates one embodiment of a second positional state of the mobile computing device 110. The mobile computing device 110 hosts and executes a phone application 354 for placing and receiving telephone calls.

It is noted that for ease of understanding the principles disclosed herein are in an example context of a mobile computing device 110 with telephonic functionality operating in a mobile telecommunications network. However, the principles disclosed herein may be applied in other duplex (or multiplex) telephonic contexts such as devices with telephonic functionality configured to directly interface with public switched telephone networks (PSTN) and/or data networks having voice over internet protocol (VoIP) functionality. Likewise, the mobile computing device 110 is only by way of example, and the principles of its functionality apply to other computing devices, e.g., desktop computers, server computers and the like.

The mobile computing device 110 includes a first portion 110a and a second portion 110b. The first portion 110a comprises a screen for display of information (or data) and may include navigational mechanisms. These aspects of the first portion 110a are further described below. The second portion 110b comprises a keypad 150 and also is further described below. The first positional state of the mobile computing device 110 may be referred to as an "open" position, in which the first portion 110a of the mobile computing device slides in a first direction exposing the second portion 110b of the mobile computing device 110 (or vice versa in terms of movement). The mobile computing device 110 remains operational in either the first positional state or the second positional state.

The mobile computing device 110 has a form factor that is convenient to hold in a user's hand. For example, the mobile computing device 110 may have a personal digital assistant (PDA) or a smart phone form factor. The mobile computing device 110 may also have dimensions ranging from 7.5 to 15.5 centimeters in length, 5 to 15 centimeters in width, 0.5 to 2.5 centimeters in thickness and weigh between 50 and 250 grams.

The mobile computing device 110 includes a speaker 120, a screen 130, and an optional navigation area 140, as shown in the first positional state. The mobile computing device 110 also includes the keypad 150, which is exposed in the second positional state. The mobile computing device also includes a microphone (not shown). The mobile computing device 110 also may include one or more switches (not shown). The one or more switches may be buttons, sliders, or rocker switches and can be mechanical or solid state (e.g., touch sensitive solid state switch).

The screen 130 of the mobile computing device 110 is, for example, a 240×240, a 320×320, a 320×480, or a 640×480 touch sensitive (including gestures) display screen. The screen 130 can be structured from, for example, such as glass, plastic, thin-film or composite material. The touch sensitive screen may be a transflective liquid crystal display (LCD) screen. In alternative embodiments, the aspect ratios and resolution may be different without departing from the principles of the inventive features disclosed within the description. By way of example, embodiments of the screen 130 comprises an active matrix liquid crystal display (AMLCD), a thin-film transistor liquid crystal display (TFT-LCD), an organic light emitting diode (OLED), an interferometric modulator display (IMOD), a liquid crystal display (LCD), or other suitable display device. In an embodiment, the display displays color images. In another embodiment, the screen 130 further comprises a touch-sensitive display (e.g., pressure-sensitive (resistive), electrically sensitive (capacitive), acoustically sensitive (SAW or surface acoustic wave), photo-sensitive (infra-red)) including a digitizer for receiving input data, commands or information from a user. The user may use a stylus, a finger or another suitable input device for data entry, such as selecting from a menu or entering text data.

The optional navigation area 140 is used for controlling functions of an application executed in the mobile computing device 110 and is visible through the screen 130. For example, the navigation area includes an x-way (x is a numerical integer, e.g., 5) navigation ring that provides cursor control, selection, and similar functionality. In addition, the navigation area may include selection buttons to select functions displayed through a user interface on the screen 130. In addition, the navigation area also may include dedicated function buttons for functions such as, for example, a calendar, a web browser, an e-mail client or a home screen. In this example, the navigation ring may be implemented through mechanical switches, solid state switches, dials, or a combination thereof. In an alternate embodiment, the navigation area 140 may be a dedicated gesture area, which allows for gesture interaction and control of functions shown through a user interface on the screen 130.

The keypad 150 may be a numeric keypad (e.g., a dialpad) or a numeric keypad integrated with an alpha or alphanumeric keypad or character keypad (e.g., a keyboard with consecutive keys of Q-W-E-R-T-Y, A-Z-E-R-T-Y, or other equivalent set of keys on a keyboard such as a DVORAK keyboard or a double-byte character keyboard).

Although not illustrated, it is noted that the mobile computing device 110 may also include an expansion slot. The expansion slot is configured to receive and support expansion cards (or media cards). Examples of memory or media card form factors include COMPACTFLASH, SD CARD, XD CARD, MEMORY STICK, MULTIMEDIA CARD, SDIO, and the like.

Example Mobile Computing Device Architectural Overview

Figure 2:
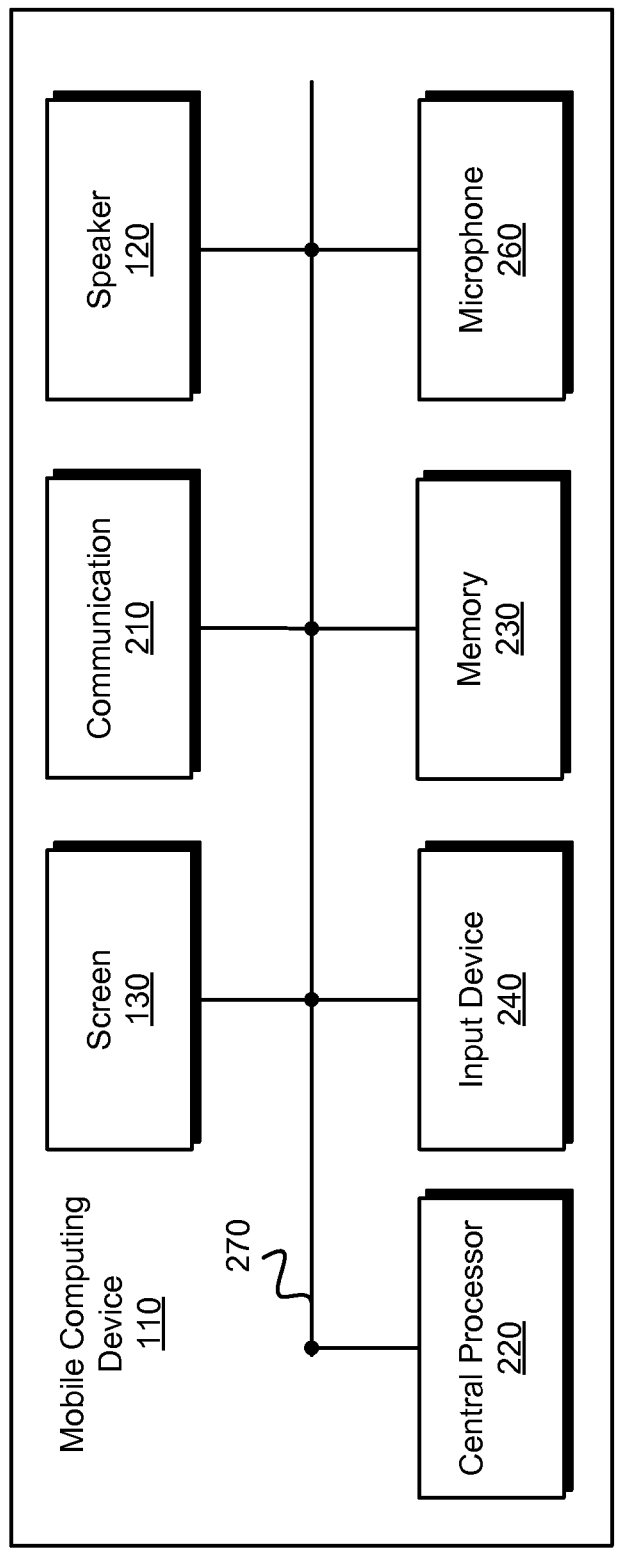
FIG. 2 is a functional block diagram illustrating the components of a mobile computing device, according to one embodiment.

Referring next to FIG. 2, a block diagram illustrates one embodiment of the architecture of the mobile computing device 110 with telephonic functionality. By way of example, the architecture illustrated in FIG. 2 will be described with respect to the mobile computing device of FIGS. 1B and 1C. The mobile computing device 110 may include, among other components, a central processor 220, the screen 130, a communication module 210, the speaker 120, an input device 240, a memory module 230, a microphone 260 and a bus 270 coupling these components. Additional components may be provided in the mobile computing device 110. Also, some components in FIG. 2 may be omitted or combined with other components in FIG. 2. Numerous other components and variations are possible to the hardware architecture of the computing device 110. Thus, an embodiment such as shown by FIG. 2 is merely illustrative.

Examples of the central processor 220 include processing chips and system based on architectures such as ARM (including cores made by microprocessor manufacturers), ARM XSCALE, AMD ATHLON, SEMPRON or PHENOM, INTEL XSCALE, CELERON, CORE, PENTIUM or ITANIUM, IBM CELL, POWER ARCHITECTURE, SUN SPARC and the like. The central processor 220 communicates with the screen 130, the input device 240, the communication module 210, the memory module 230, the speaker 120 and the microphone 260 via the bus 270.

In one embodiment, central processor 220 executes logic (e.g., by way of programming, code, or instructions) corresponding to executing applications interfaced through, for example, the input device 240 (e.g., the navigation area 140 or switches 170).

The communication module 210 transmits and receives signals for communicating with a wireless network. The communication module 210 may include two separate components for transmitting and receiving signals or a single component for both transmitting and receiving signals. In either instance, it is referenced as a communication module 210. The receiver portion of the communication module 210 communicatively couples with a radio signal input (e.g., an antenna) of the device 110 that receives communication signals for an established call (e.g., a connected or on-going call). The received communication signals include voice (or other sound signals) received from the call and processed for output through the speaker 120. The transmitter portion of the communication module 110 communicatively couples a radio signal output (e.g., the antenna) of the device 110 that transmits communication signals to an established call (e.g., a connected or on-going call). The communication signals for transmission include, for example, voice signals received through the microphone 260 of the device 110 that is processed for transmission through the transmitter of the communication module 210 to the established call.

In one embodiment, communications using the communication module 210 may be over a voice or data network. Examples of voice networks include Global System of Mobile (GSM) communication system, a Code Division, Multiple Access (CDMA system), and a Universal Mobile Telecommunications System (UMTS). Examples of data networks include General Packet Radio Service (GPRS), third-generation (3G) mobile (or greater), High Speed Download Packet Access (HSDPA), High Speed Uplink Packet Access (HSUPA), and Worldwide Interoperability for Microwave Access (WiMAX).

The memory module 230 is a computer readable storage medium for storing instructions executed by the central processor 220. The memory module 230 may be volatile memory such as RAM, non-volatile memory such as a flash memory or a combination thereof. The memory module 230 may store various software components for performing operations on the mobile computing device 110, as described below in detail with reference to FIG. 3.

Software Components of Mobile Computing Device

Figure 3:
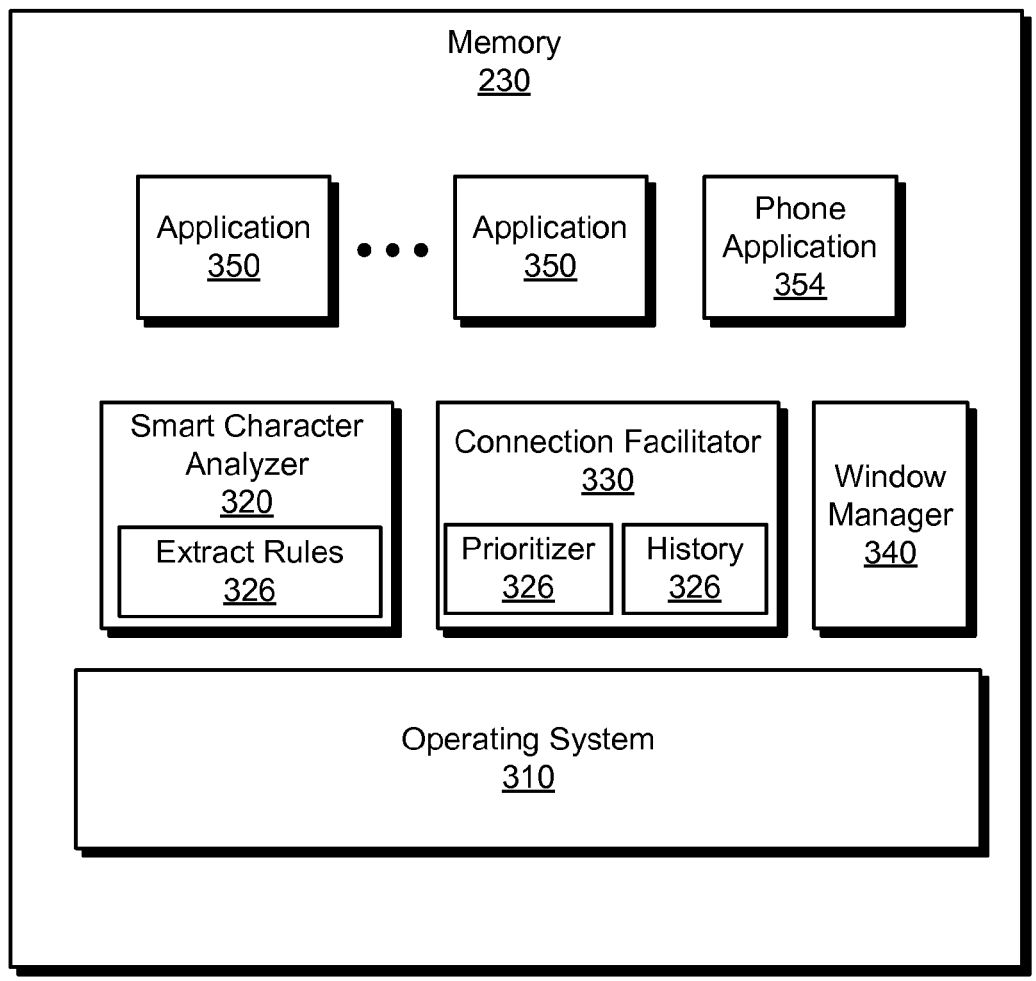
FIG. 3 is a block diagram illustrating software components in a memory module of a mobile computing device, according to one embodiment.

FIG. 3 is a block diagram illustrating software components stored in the memory module 230 of the mobile computing device 110, according to one embodiment. The memory module 230 may include, among other components, applications 350, the phone application 354, a smart character analyzer 320, a connection facilitator 330 and a window manager module 340. One or more of these components may be integrated into a single module or be divided into two or more sub-modules. Some of these components may be omitted. Also, additional software components may be stored in the memory module 230.

The operating system 310 provides a host environment for applications that are run on the mobile computing device 110 to interface between hardware and applications. The operating system 310 manages resources and coordinates operations on the mobile computing device 110. Examples of an operating system include PALM OS and WEBOS, MICROSOFT WINDOWS (including WINDOWS 7, WINDOWS CE, and WINDOWS MOBILE), SYMBIAN OS, RIM BLACKBERRY OS, APPLE OS (including MAC OS and IPHONE OS), GOOGLE ANDROID, and LINUX.

The window manager module 340 initializes a virtual display space, which may be instantiated on the screen 130. The virtual display space includes one or more applications currently being executed by a user and the current status of the executed applications. The window manager module 340 receives requests, from user input or from software or firmware processes, to render a user interface such as a window. Additionally, the window manager module 340 receives commands or instructions to modify a window, such as resizing the window, moving the window or any other command altering the appearance or position of the window, and modifies the window accordingly. The window manager module 340 may be implemented as software, firmware, hardware or a combination thereof.

The applications 350 may be loaded and executed on the mobile computing device 110 to perform various operations. The applications 350 may include, among others, an email application, a contact management application, and a calendar application. These applications may interoperate to exchange data via the operating system 310 or other software components to facilitate consistent and intuitive operations on the mobile computing device 110. Each application accesses and manages certain data items such as emails, contact information and calendar entries.

The email application sends and receives emails via the communication module 210. The email may include telephone numbers and at least one character associated with the telephone number, as described below in detail with reference to FIGS. 6A and 8. In one embodiment, the email application scans the email and highlights numbers that are likely to be telephone numbers. A user may select a highlighted number to place a phone call to the highlighted number.

The contact management application allows users to manage contact information for people and entities. Each data item associated with contact information may include fields such as emails, telephone numbers and addresses of people or entities. The contact information may also include extension numbers associated with a telephones system, as described below in detail with reference to FIG. 4A.

The calendar application allows a user to manager schedules. Data items associated with the schedule may include fields such as time, place of an event and person or entity associated with an event, as described below in detail with reference to FIG. 5A. Many calendar applications provide alert services for providing alerts to the users about the events.

The phone application 354 manages resources (e.g., the communication module 210) of the mobile computing device 110 to place or receive phone calls. In one embodiment, the phone application interoperates with one or more applications 350 and the connection facilitator 330 to display an outgoing telephone number to which a connection is being attempted or display an incoming telephone number from which a call is being received.

The contact management application, the calendar application and the phone application are merely examples of application that can be executed on the mobile computing device 110. A single application may provide functionality of all these applications. Alternatively, more than one application may provide the same or similar functionality. In one embodiment, the applications exchange information to provide convenient and consistent data management. Further, one or more applications 350 may communicate with a remote server over a network to synchronize the data items.

The smart character analyzer 320 scans data items associated with the applications 350 to detect characters representing telephone numbers or other characters associated with the telephone numbers. For this purpose, the smart character analyzer 320 includes extract rules 326 for determining if a character or a string of characters is likely to be a telephone number or be associated with a telephone number. In one embodiment, the smart character analyzer 320 includes a database storing identifiers (e.g., "EXT," "ext," "x," "Ext.," "PIN," "ID#," "password," "PW," and "code#") that may indicate that indicates that a character or a string of characters associable with a telephone number.

The following are sample rules for detecting telephone numbers: (i) if a number is 7 digits long, this number is likely to be a telephone number without an area code, (ii) if a number is 10 digits long, this number is likely to be a telephone number with an area code, (iii) if a 3 digit number is followed by a character space, a dot (.) or a dash (-) and then a 4 digit number, the string of numbers likely represents a telephone number without an area code, (iv) if a 3 digit number is followed by a space, a dot (.) or a dash (-), then another 3 digit number which is followed by a space, a dot (.) or a dash (-) and then a 4 digit number, this string of numbers likely represents a telephone number with an area code, and (v) if a 3 digit number is enclosed in parenthesis, then the three-digit number is likely to represent an area code.

The extract rules 326 may also include rules for detecting and extracting a character or a string of characters that are not a telephone number but associated with a telephone number. The character or the string of characters associated with the telephone number may be characters needed for accessing a remote service provided by the telephone system 108. The characters associated with the telephone number includes, for example, an extension number of a PBX, a passcode for a conference call service, and a password for accessing personal information (e.g., voicemail and bank account information). In one embodiment, the string of characters is transmitted from the mobile computing device 110 to the remote system 108 as DTMF signals.

In one embodiment, the extract rules 326 detect an identifier that indicates that a character or a string of characters associated with a telephone number is likely to follow. The extract rules 326 also determine the length of the character or the string of characters, for example, by detecting certain characters (e.g., a space or a comma) or by detecting the end of a number sequence and starting of an alphabet. Taking an example of scanning a data entry for extension number associated with a telephone number, the identifier may be a character or characters such as "EXT," "ext" "x" and "Ext." The smart character analyzer 320 may determine that any number or numbers after these identifiers are an extension number associated with a telephone number. Also, for passcode or password for accessing other IVR systems such as a phone conference system or a remote banking system, characters such as "PIN," "ID#," "password," "PW," and "code#" may serve as identifiers.

After detecting any string of characters likely to be associated with a telephone number, the smart character analyzer 320 sends the detected string of characters to the connection facilitator 330. Alternatively, the smart character analyzer 320 tags a data item with the extracted telephone number and/or the associated character(s), and stores the tagged data item for later retrieval by the connection facilitator 330 or the applications 230.

The connection facilitator 330, alone or in combination with the window manager module 340, automatically displays a character or a string of characters associated with the telephone number on the screen 130 for selection by the user. By automatically presenting the character or the string of characters, the user need not switch between the applications 350 and the phone application 354 or perform manual task of memorizing or writing down the character or the string of characters. The user is conveniently presented with selecting the character or the string of characters to be transmitted to the telephone system 108. In one embodiment, the connection facilitator 330 generates a popup window or other user interface elements on the screen 130. The popup window or user interface elements may be generated and displayed on the screen 130 simultaneously when placing a phone call to the telephone number or after a phone connection is established using the telephone number.

In one embodiment, the connection facilitator 330 includes a prioritizer 326 and a history record 326. The prioritizer 326 prioritizes two or more characters or strings of characters likely to be associated with the telephone number. A data item of the application may include two or more characters or strings of characters that can be associated with a telephone number. For example, an email may include a telephone number, an extension number and a number (e.g., date) irrelevant to accessing the telephone system. The number that is irrelevant to the telephone number may also be in a format similar to the extension number. Because the smart character analyzer 320 has limited or no capability to understand the context of the email, the smart character analyzer 320 may determine that both the extension number and the irrelevant number (e.g., date) are likely to be associated with the telephone number. The prioritizer 326 evaluates which numbers are more likely to be associated with the telephone number. Based on the evaluation, the connection facilitator 330 displays the numbers more likely to be associated with the telephone number with a higher priority (e.g., an upper row in a list) while displaying numbers less likely to be associated with the telephone number with a lower priority (e.g., a lower row in the list). By prioritizing the characters or the strings of characters, the user can more conveniently choose the correct characters or strings of characters associated with the telephone number.

To evaluate the characters, the prioritizer 326 is associated with the history record 326 that stores characters or strings of characters previously sent after a call was placed to the same telephone number. A character or a string of characters previously sent after placing a call to a telephone number is likely to be associated with the telephone number. Also, the same telephone number is likely to be associated with the same character or strings of characters. Hence, by maintaining the history record 326 of the characters or strings of characters in association with the telephone number, the connection facilitator 330 can more intelligently predict or assess characters or strings of characters associated with the telephone number.

Examples of Using Character Extracted from Contact Information

Figure 4A:
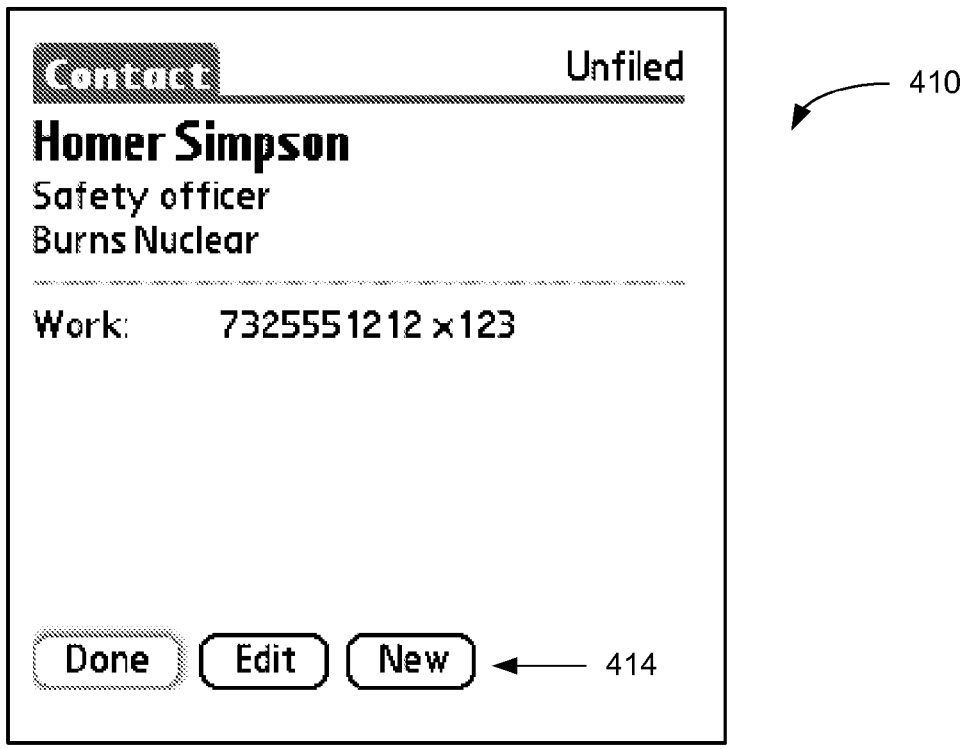
FIG. 4A is a diagram illustrating a user interface for accessing contact information on a mobile computing device, according to one embodiment.

FIG. 4A is a diagram illustrating a user interface 410 for accessing contact information on the mobile computing device 110, according to one embodiment. The user interface 410 is displayed and made accessible by a contact management application executed on the mobile computing device. In the example of FIG. 4A, a work telephone number of "Homer Simpson" is displayed as "732 555 1212" and an extension number associated with this work number is displayed as "123." In order to reach "Homer Simpson," a user must first place a call to the telephone number "732-555-1212" and then enter the extension number "123." The user interface 410 also includes "Done," "Edit," and "New" soft buttons 414 for closing the contact information screen, editing the contact entry and entering a new entry, respectively.

In one embodiment, when the contact information for "Homer Simpson" is accessed by a user, the smart character analyzer 320 scans the contact information. Based on the extract rules 326, the smart character analyzer 320 determines that first 10 digits correspond to the telephone number of "Homer Simpson." Further, the smart character analyzer 320 determines that the three digits "123" following "x" is likely to be an extension number to reach "Homer Simpson." The smart character analyzer 320 sends the scanned result of the telephone number and the extension number to the connection facilitator 330. In another embodiment, the smart character analyzer 320 scans, tags the contact information with the extension number, and stores the tagged contact information so that the connection facilitator 330 can later retrieve tagged contact information.

Figure 4B:
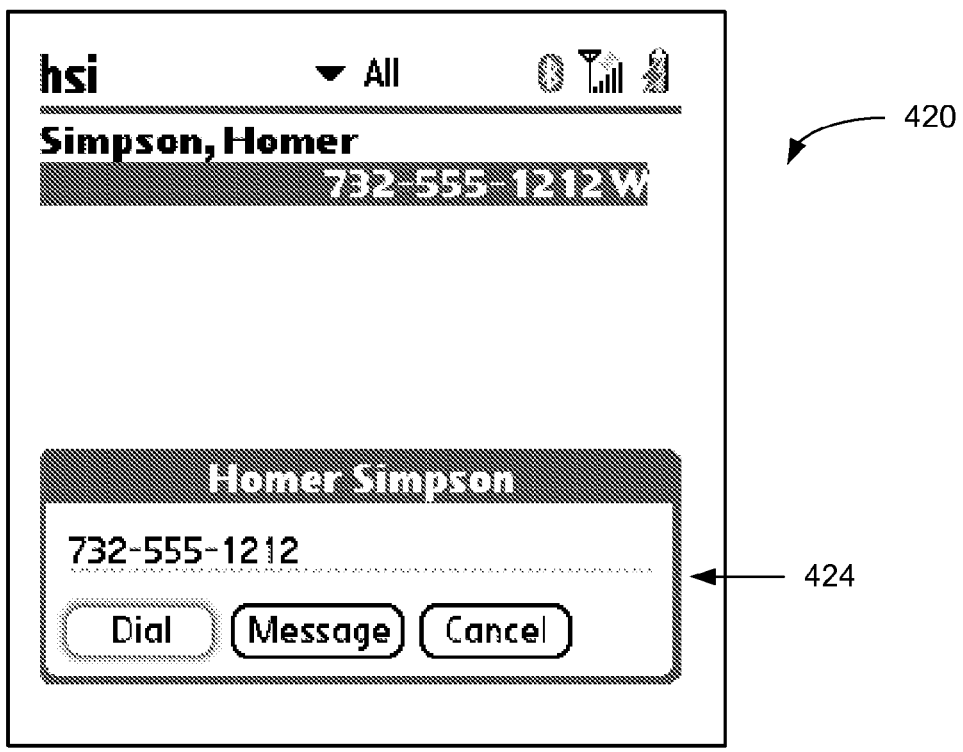
FIG. 4B is a diagram illustrating a user interface for placing a call to a destination, according to one embodiment.

FIG. 4B is a diagram illustrating a user interface 420 for placing a call to a destination in FIG. 4A, according to one embodiment. When the entry (i.e., data item) for "Homer Simpson" is selected on the user interface 420, a popup window 424 is displayed on the screen 130. The popup windows 424 includes soft buttons allowing the user to "dial" the telephone number, send a text "message" to the telephone number, or "cancel" the operation.

Figure 4C:
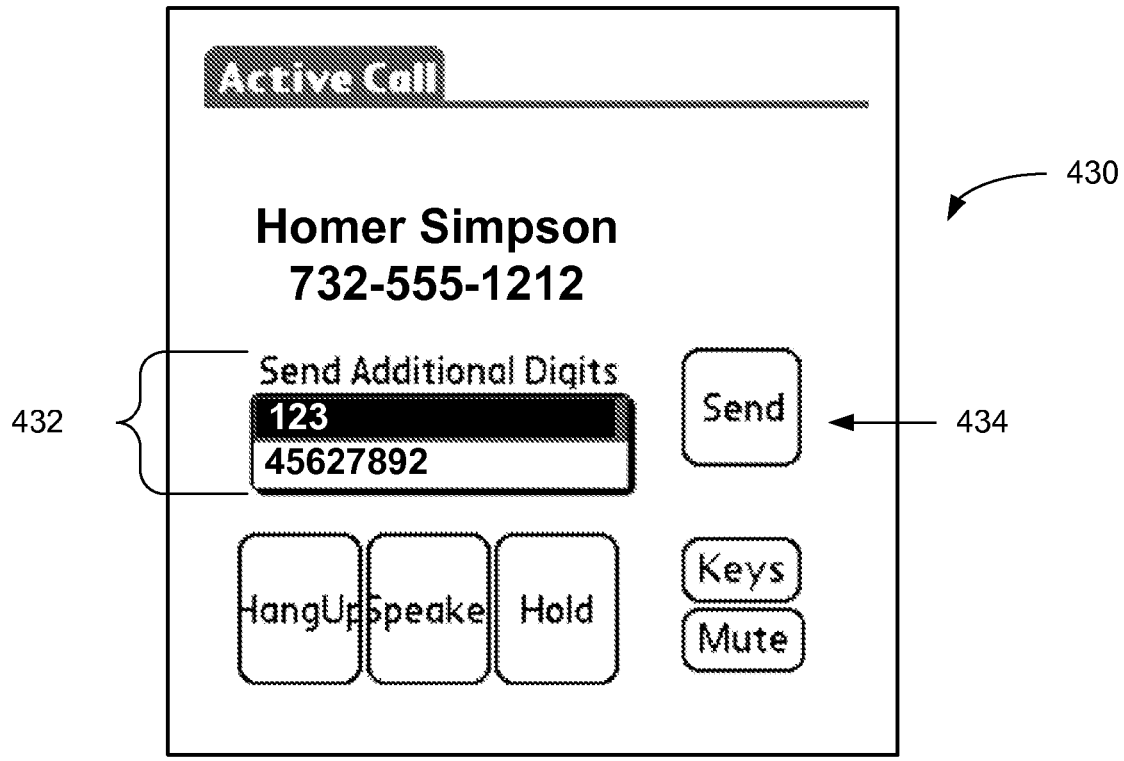
FIG. 4C is a diagram illustrating a user interface for sending an extension number to reach the destination, according to one embodiment.

FIG. 4C is a diagram illustrating a user interface 430 for sending an extension number to reach the destination in FIGS. 4A and 4B, according to one embodiment. After the "dial" soft button in the user interface 420 of FIG. 4B is selected by the user, the user interface 430 is displayed on the screen 130. In one embodiment, the user interface 430 is displayed to the user after the user selects the "call" soft button of FIG. 4B. For example, the user interface 430 is displayed to the user when a call connection to the destination is established by sending DTMF signals corresponding to the telephone number via the phone network 104.

In one embodiment, the user interface 430 includes a pull down box 432 for selecting additional numbers to be sent to the phone network 104 once a call is established with the telephone number 732-555-1212. For example, the user may select the number that corresponds to the extension number ("123" in this case). The number "45627892" is a number that does not appear in the contact information as illustrated in FIG. 4A but obtained from information scanned from entries of other applications (e.g., emails) or the history records 326 associated with "Homer Simpson" or the telephone number "732 555 1212." After the user makes a selection to place a call to the telephone number "732 555 1212," the call is dialed by the mobile computing device 100. After the connection is established, the user may wait for a request from the telephone system 108 asking to enter an extension number and then press a soft button 434 to select a number corresponding to the extension number ("123" in this case). In response, the mobile computing device 110 generates and sends DTMF signals corresponding to the extension number "123."

In another embodiment, the connection facilitator 330 automatically sends the extension number or other string of characters likely to be associated with a telephone number after a signal is received from the telephone system 108 requesting the extension number or other string of characters. The connection facilitator 330 monitors the established call to receive a voice message and to process the voice message by a speech recognition program to detect the request for the extension number or other string of characters. Alternatively, the telephone system 108 can send a DTMF signal indicating input of the extension number or other string of characters. The connection facilitator 330 then sends the extension number or other string of characters automatically without user input after detecting the signal requesting the extension number or other string of characters associated with the telephone number.

The pull down box 432 of FIG. 4C is merely an example. Various other user interface elements may be used to display characters or strings for characters associated with a telephone number. In one embodiment, the user interface elements associated with the additional string of characters also indicate the source of the characters or string of characters. For example, a small icon representing contact information may be presented next to the number "123" and another icon representing an email may be presented next to the number "45627892" in FIG. 4C.

After the mobile computing device 110 transmits the additional characters selected by the user, the transmitted characters are stored in the history records 326 in association with the telephone number. In one embodiment, the connection facilitator 330 tallies a score for each candidate string of characters associated with a telephone number. The score represents the likelihood that the string of characters is the characters to be sent after establishing a connection to the telephone system 108. If another phone call is again placed to the same telephone number, the prioritizer 326 selectively lists a character or a string of characters having the highest scores or display the character or the string of characters in a descending order of their scores (e.g., display on an upper row of the pull down box 432).

Examples of Using Additional Number Extracted from Calendar Data Item

Figure 5A:
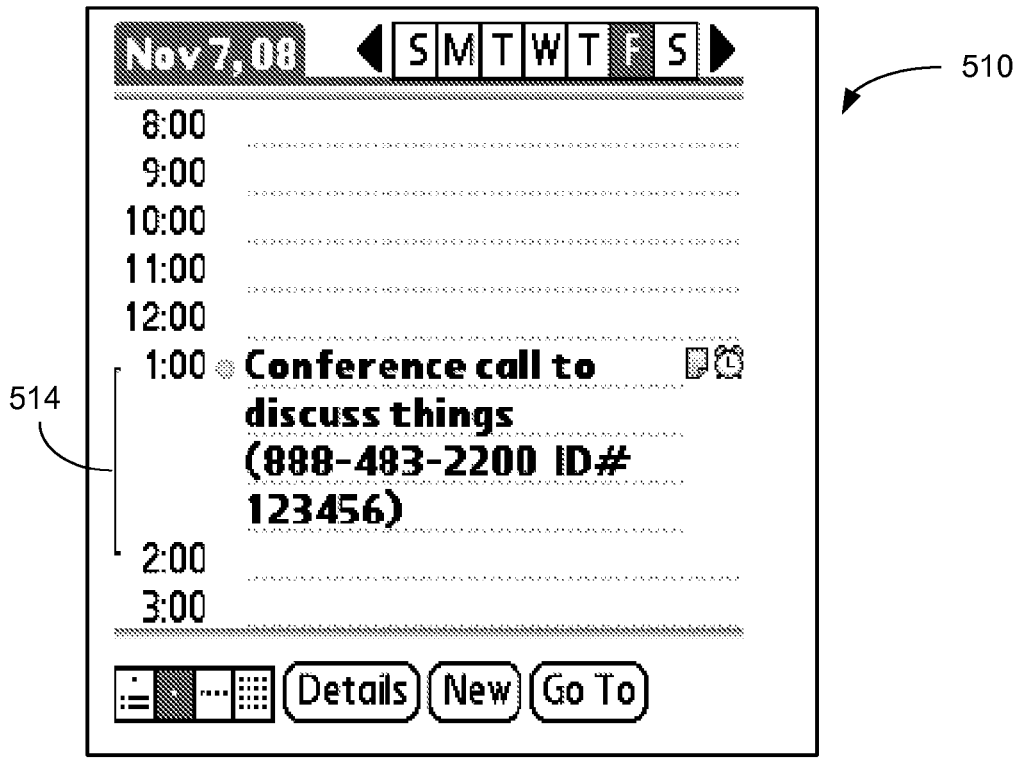
FIG. 5A is a diagram illustrating a user interface for accessing calendar entries on a mobile computing device, according to one embodiment.

FIG. 5A is a diagram illustrating a user interface 510 for accessing calendar data items on the mobile computing device 110, according to one embodiment. The calendar data items are accessible and made available to the user by a calendar application executed on the mobile computing device 110. In the example of FIG. 5A, a calendar data item 514 for a conference call is displayed. The data item 514 specifies the telephone number for a call bridge (888-483-2200) provided by the telephone system 108 and a passcode (#123456) for accessing the call bridge.

In one embodiment, when a user accesses the calendar data item 514 for the conference call, the smart character analyzer 320 scans the calendar data item 514 associated with the phone conference. Based on the extract rules 326, the smart character analyzer 320 determines that a 10 digit number (888-483-2200) in the data item 514 are likely to be a telephone number. Further, the smart character analyzer 320 determines that the 6 digit number "123456" following "ID#" is likely to be a passcode associated with the telephone number. The smart character analyzer 320 sends the scanned result of the telephone number and the passcode to the connection facilitator 330. In another embodiment, the smart character analyzer 320 then scans, tags the calendar data item with the passcode, and stores the tagged calendar data item so that the connection facilitator 330 can retrieve the tagged calendar data item at a later time.

Turning back to FIG. 5B, a diagram illustrates a user interface 520 for placing a conference call shown in the calendar data item 514 of FIG. 5A, according to one embodiment. When a user places a call to the telephone number in the calendar, the user interface 520 is displayed on the screen 130. The user interface 520 includes a pull down box 524 displaying a string of characters or numbers "12345" or "563" that can be sent after the user places a phone call to access a conference call service. The number "12345" originates from the data item of the calendar application while the number "563" may originate from other sources such as data items of other applications or the history records 326.

Figure 5B:
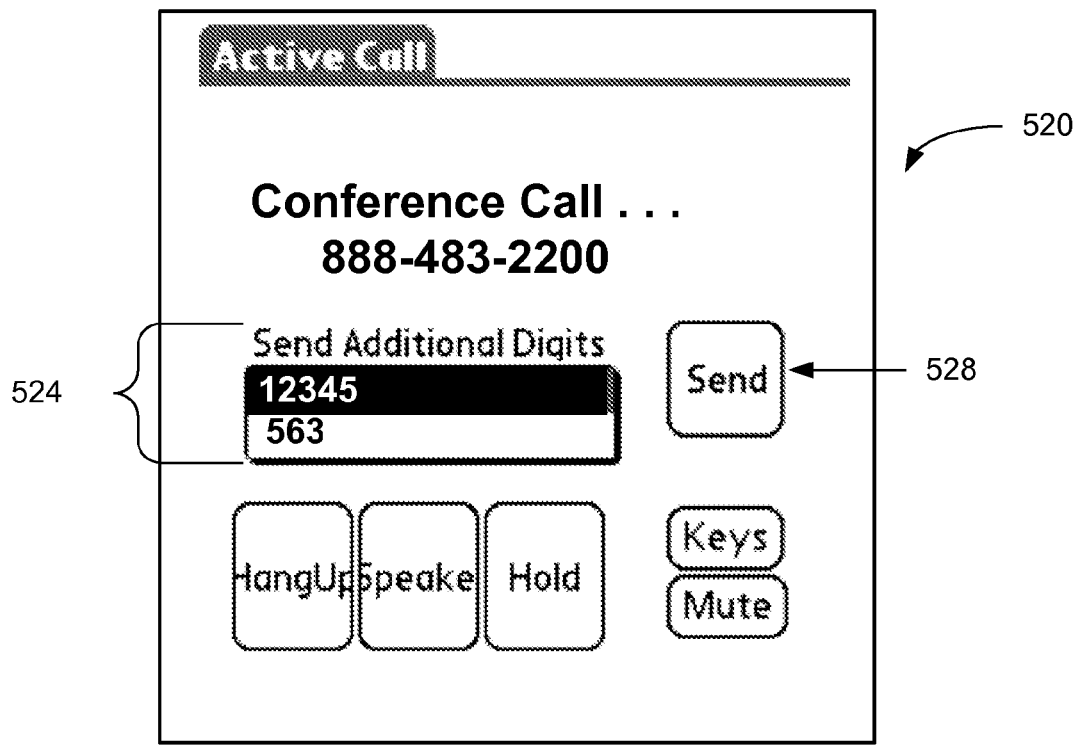
FIG. 5B is a diagram illustrating a user interface for placing a conference call described in a calendar entry of FIG. 5A, according to one embodiment.

In the example of FIG. 5B, a user may select a string of characters "12345" or "563" after a call is placed to the telephone number "888-483-2200." After the user receives a message from a conference system, the user may press a soft button 528 to send DTMF signals corresponding to the selected characters to the conference system. The soft button 528 may be selected, for example, by receiving user input via a touch sensitive display screen.

The pull down box 524 of FIG. 5B is merely an example and various other user interface elements may be used to display strings of characters for accessing the phone conference service. In one embodiment, the user interface elements associated with the additional string of characters may also indicate the source of the characters.

In one embodiment, after the mobile computing device 110 sends a character or a string of character selected by a user, the character or the string of characters is stored in the history records 326. As described above with reference to FIG. 4C, a score may be tallied for each character or a string of characters to indicate likelihood of being associated with a telephone number. The score represents the likelihood that the string of characters is the correct characters to be sent after connecting to a telephone number. When another phone call is placed to the same telephone number, the prioritizer 326 prioritizes the display of the candidate character or the string of characters on the pull down box 524 based on the score or selectively displays the characters of the string of characters with the highest scores.

Examples of Using Additional Characters Extracted from Email

Figure 6A:
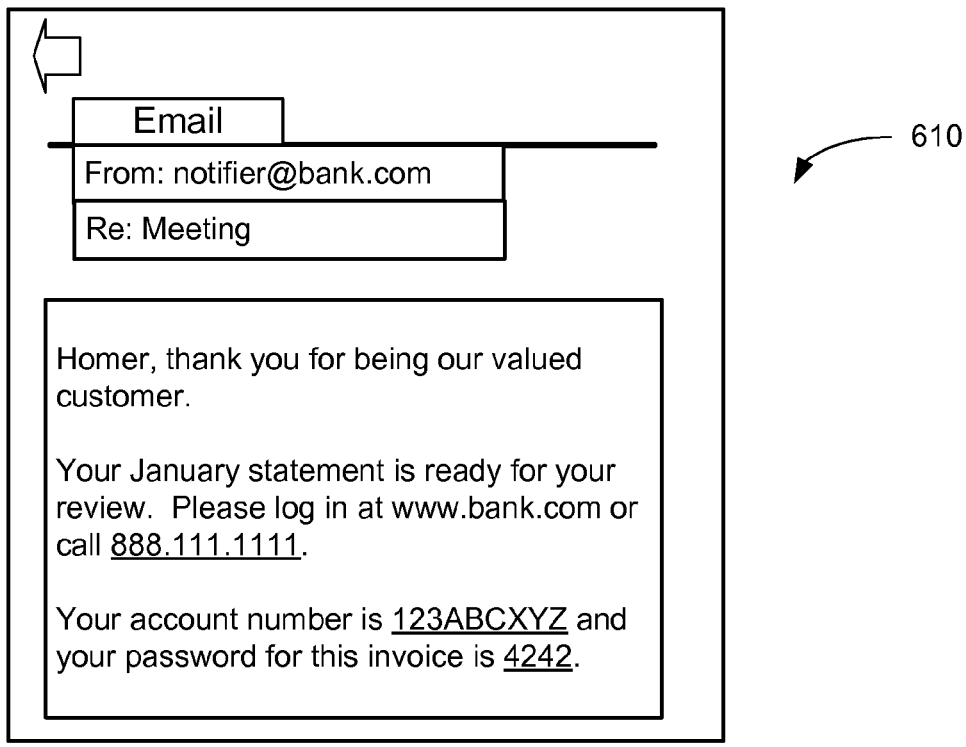
FIG. 6A is a diagram illustrating a user interface for displaying an email, according to one embodiment.

FIG. 6A is a diagram illustrating a user interface 610 for displaying an email, according to one embodiment. The email is accessible and made available to the user by an email application executed on the mobile computing device 110. In the example of FIG. 6A, an email associated with a bank account is displayed. The email specifies the telephone number (888.111.1111) for accessing a bank account (123AB-CXYZ) and a password (4242) for accessing the banking system.

In one embodiment, when the email is accessed by a user, the smart character analyzer 320 scans the email for any string of characters likely to be a telephone number and other strings of characters likely to be associated with the phone conference. Based on the extract rules 326, the smart character analyzer 320 determines that 10 digits (888.111.1111) in the email are likely to be a telephone number. Further, the smart character analyzer 320 determines that the nine characters "123ABCXYZ" and a four digit number "4242" are likely to be strings of characters associated with the telephone number because they are preceded by "account number" and "password" recognized as identifiers by the smart character analyzer 320. The smart character analyzer 320 sends the scanned string of characters and the telephone number to the connection facilitator 330. In another embodiment, the smart character analyzer 320 scans, tags the email with the string of characters, and stores the tagged email so that the connection facilitator 330 can retrieve tagged contact information at a later time.

Figure 6B:
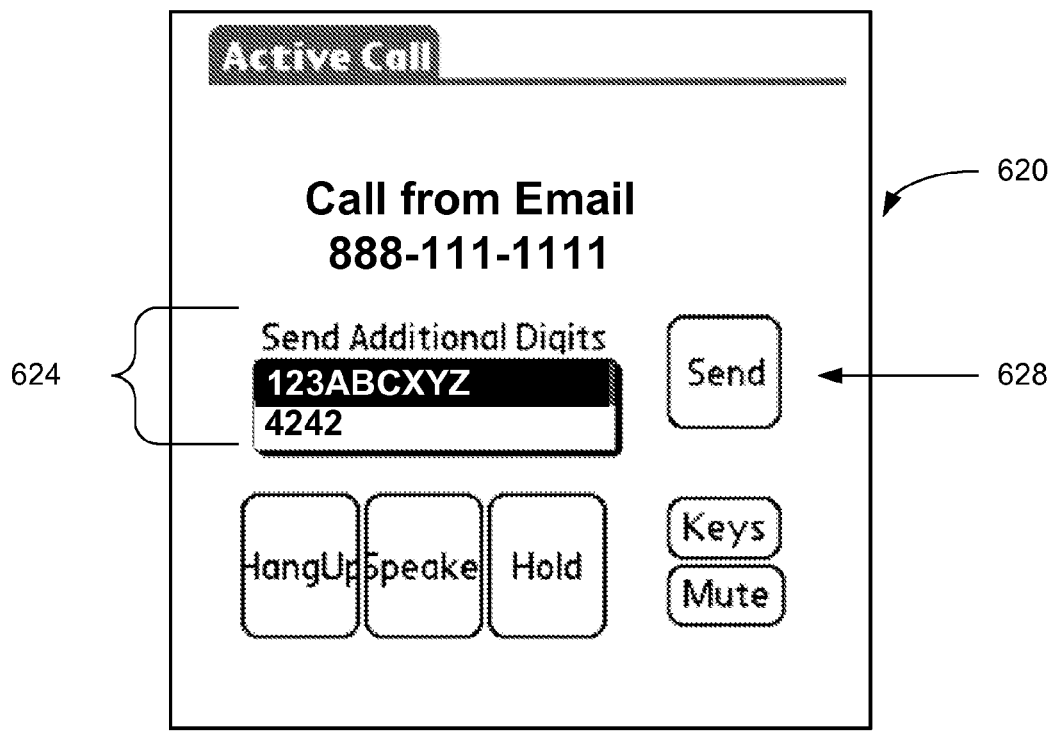
FIG. 6B is a diagram illustrating a user interface for sending a passcode to access a phone conference as described in FIG. 6A, according to one embodiment.

FIG. 6B is a diagram illustrating a user interface 620 for placing a call to an email described in FIG. 6A. The phone call may be placed, for example, by pressing the area of the screen 130 corresponding to the telephone number "888.111.1111." After the user selects to place a call to the telephone number, the user interface 620 is displayed on the screen 130. The user interface 620 includes a pull down box 624 displaying strings of characters "123ABCXYZ" and "4242" extracted from the email. In one embodiment, keys of in the input device 240 indicating numeric digits may be mapped to alphabet characters so that the user can input alphabet characters using the input device 240. In order to access information from a remote banking system by calling the telephone number indicated in the email of FIG. 6A, a user needs to send DTMF signals corresponding to these two additional strings of characters in a proper sequence. The user may listen to the messages of the remote banking system over the phone, and then select appropriate strings of characters in the pull down box 624, and press "send" soft key 628 to send DTMF signals to the IVR system.

The pull down box 624 of FIG. 6B is merely an example. Various other user interface elements may be used to display candidate strings for characters accessing the phone conference. In one embodiment, the user interface elements associated with the additional string of characters may also indicate the source of the characters.

In one embodiment, after the user selects a string of character and sends the additional numbers, the number sent to the remote banking system is stored in the history records 326 in association with the telephone number for the remote banking system. The stored number may be scored and later retrieved when placing a phone call to the same remote banking system.

Figure 7:
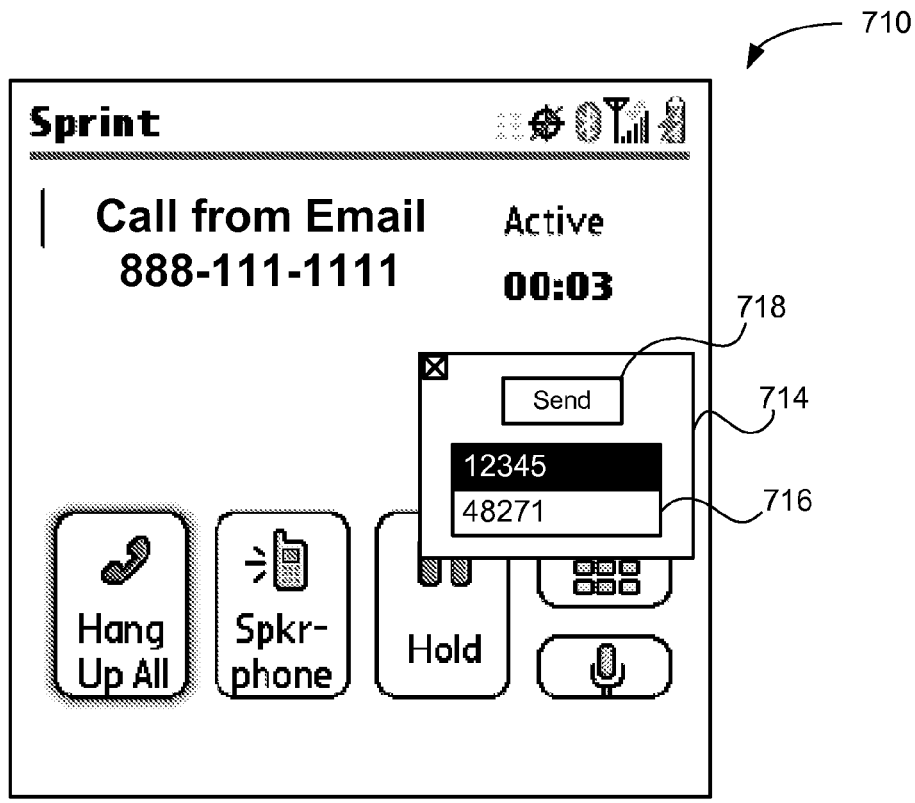
FIG. 7 is a diagram illustrating a popup window overlaid on a user interface for dialing a destination, according to one embodiment.

FIG. 7 is a diagram illustrating a popup window 714 overlaid on a user interface 710 for dialing a destination, according to one embodiment. The popup window 714 may be displayed when the user selects a string of characters from an email message to place a call. The popup window 714 includes a pull down box 716 and a "send" soft button 718. The pull down box 716 displays string of characters associated with a telephone number. A user may choose a string of characters by toggling through the pull down box 716 and then press the button 718 to send DTMF signals corresponding to the chosen string of characters to the remote banking system.

Example Process of Connecting to Telephone System

Figure 8:
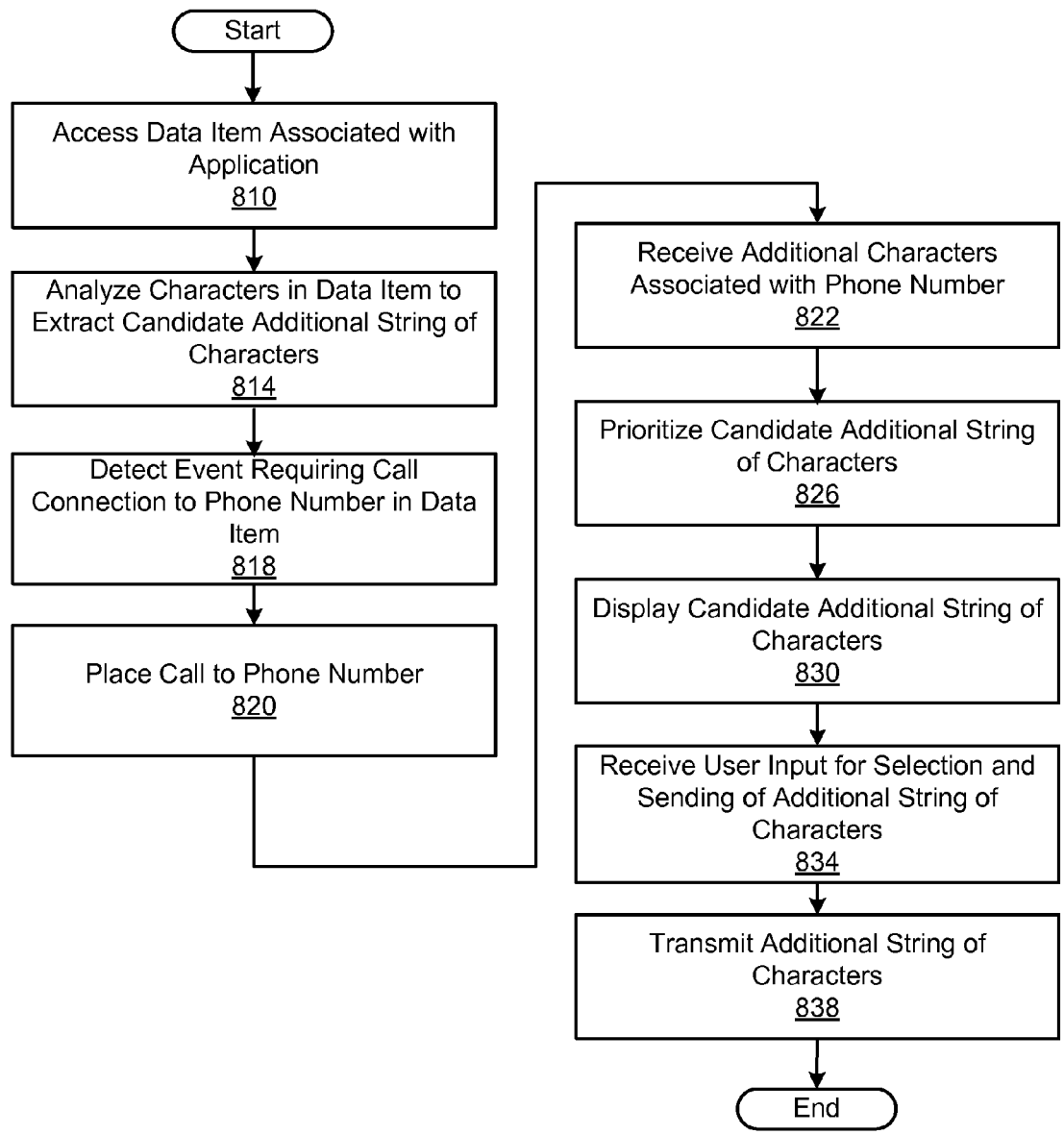
FIG. 8 is a flowchart illustrating a process of identifying and sending an additional string of characters, according to one embodiment.

FIG. 8 is a flowchart illustrating a process of identifying and sending a character or a string of characters to the telephone system 108, according to one embodiment. The smart character analyzer 320 accesses 810 a data item (e.g., email, contact information, calendar entry, account details, etc.) associated with an application running on the mobile computing device 110. In one embodiment, the smart character analyzer 320 accesses the data when a user is about to view or perform any actions based on the data item. In another embodiment, the smart character analyzer accesses multiple new data items in batches when the mobile computing device 110 is idle.

The smart character analyzer 320 then analyzes 814 characters in the data item according to the extract rules 326. As set forth above with reference to FIG. 3, the smart character analyzer 320 scans the data item for telephone numbers and a character or a string of characters associated with the telephone number. In one embodiment, the scanned telephone numbers and the strings of characters are sent to the connection facilitator 330. In another embodiment, the scanned telephone numbers and the strings of characters are tagged to the data item and stored for later access by the connection facilitator 330.

An event is then detected 818 at the mobile computing device 110 that requires a call connection to a telephone number in the data item. The event requiring the call connection includes, for example, receiving user input via the input device 240 indicating placing of a call to the telephone system 108. In response, the mobile computing device 110 places a phone call to the telephone number to connect with the telephone system 108.

The connection facilitator 330 receives 822 additional characters associated with the telephone number. If there are more than one string of characters associated with the telephone number, the connection facilitator 330 prioritizes 826 the characters or the strings of characters to be displayed based on the likelihood that the characters or the strings of characters are associated with the telephone number. Then the strings of characters are displayed 830 on the screen 130 based on the prioritization performed by the connection facilitator 330.

The mobile computing device 110 receives 834 user input for selecting and sending an additional string of characters to the telephone system 108. The mobile computing device 110 then transmits 838 the additional string of characters to the telephone system 108.

The operations of FIG. 8 need not be performed in the sequence illustrated in FIG. 8. For example, receiving 822 additional characters may be performed before placing 820 a call to the telephone number. Also, one or more operations illustrated in FIG. 8 may be omitted. For example, prioritizing 826 of multiple strings of characters may be omitted.

Some portions of above description describe the embodiments in terms of algorithms and symbolic representations of operations on information, for example, as illustrated and described with respect to FIGS. 3 through 8. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or"

refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for facilitating sending of characters associated with a telephone number through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for interacting with a telephone system, comprising:
    accessing a data item associated with an application executed on a mobile computing device;
    extracting a telephone number and a string of characters associable with the telephone number by analyzing the data item with a character analyzer that applies rules for determining if a string of characters is likely to be a telephone number and applies rules for determining if a string of characters is likely to be a string of characters associable with the telephone number that would be dialed in association with the telephone number;
    connecting the mobile computing device to the telephone system by placing a call to the telephone number responsive to detecting an event requiring connection of the mobile computing device to the telephone system;
    displaying the string of characters associable with the telephone number on the mobile computing device automatically responsive to connecting the mobile computing device to the telephone system;
    receiving user input for transmitting the string of characters to the telephone system; and
    transmitting signals corresponding to the string of characters responsive to receiving the user input.

2. The method of claim 1, wherein the application comprises at least one of an email application, a calendar application and a contact management application.

3. A method for interacting with a telephone system, comprising:
    extracting a string of characters comprising at least one character associable with a telephone number from a data item accessed by a mobile computing device, said extracting being performed using a smart character analyzer that applies rules for determining if a string of characters is likely to be a telephone number and applies rules for determining if a string of characters is likely to be a string of characters associable with the telephone number that would be dialed in association with the telephone number; wherein applying rules for determining if a string of characters is likely to be string of characters associable with the telephone number comprises scanning the data item for an identifier corresponding to a string of characters associable with the telephone number that would be dialed in association with the telephone number; and determining an end of the string of characters following the identifier;
    connecting the mobile computing device to the telephone system by calling the telephone number; and
    after calling the telephone number, transmitting a signal corresponding to the extracted string of characters associable with the telephone number to the telephone system.

4. A method for interacting with a telephone system, comprising:
    extracting a string of characters comprising at least one character associable with a telephone number from a data item accessed by a mobile computing device, said extracting being performed using a smart character analyzer that applies rules for determining if a string of characters is likely to be a telephone number and applies rules for determining if a string of characters is likely to be a string of characters associable with the telephone number that would be dialed in association with the telephone number;
    connecting the mobile computing device to the telephone system by calling the telephone number; and
    after calling the telephone number, transmitting a signal corresponding to the extracted string of characters associable with the telephone number to the telephone system,
    wherein if two or more strings of characters are identified as associable with the telephone number in the data item, prioritizing the two or more strings of characters as to which is most likely to be dialed in association with the telephone number when making a call to the telephone number.

5. The method of claim 4, wherein said prioritizing is performed based on a history record of strings of characters dialed in association with telephone numbers by the mobile computing device.

6. A method for interacting with a telephone system, comprising:
    extracting a string of characters comprising at least one character associable with a telephone number from a data item accessed by a mobile computing device, said extracting being performed using a smart character analyzer that applies rules for determining if a string of characters is likely to be a telephone number and applies rules for determining if a string of characters is likely to be a string of characters associable with the telephone number that would be dialed in association with the telephone number;
    connecting the mobile computing device to the telephone system by calling the telephone number; and
    after calling the telephone number, transmitting a signal corresponding to the extracted string of characters associable with the telephone number to the telephone system, wherein after connecting the mobile computing device to the telephone system by placing a call to the telephone number, speech recognition is used to detect a request for dialing said string of characters associable with the telephone number.

7. A mobile computing device with telephonic functionality, comprising:
    a character analyzer configured to extract a string of characters comprising at least one character associable with a telephone number from a data item accessed by the mobile computing device, wherein the character analyzer applies rules for determining if a string of characters is likely to be a telephone number and applies rules for determining if a string of characters is likely to be a string of characters associable with the telephone number that would be dialed in association with the telephone number; and a communication module configured to connect the mobile computing device to the telephone system by calling the telephone number, the communicator module further configured to, after calling the telephone number, transmit a signal corresponding to the extracted string of characters associable with the telephone number to the telephone system, wherein if two or more strings of characters are identified as associable with the telephone number in the data item, the communication module prioritizes the two or more strings of characters as to which is most likely to be dialed in association with the telephone number when making a call to the telephone number.

8. The mobile computing device of claim 7, further comprising a memory storing a history record of strings of characters dialed in association with telephone numbers by the mobile computing device, wherein said prioritizing is performed based on said history record.

9. A mobile computing device with telephonic functionality, comprising:

a character analyzer configured to extract a string of characters comprising at least one character associable with a telephone number from a data item accessed by the mobile computing device, wherein the character analyzer applies rules for determining if a string of characters is likely to be a telephone number and applies rules for determining if a string of characters is likely to be a string of characters associable with the telephone number that would be dialed in association with the telephone number;

a communication module configured to connect the mobile computing device to the telephone system by calling the telephone number, the communicator module further configured to, after calling the telephone number, transmit a signal corresponding to the extracted string of characters associable with the telephone number to the telephone system; and a speech recognition program to detect a request for dialing said string of characters associable with the telephone number after connecting the mobile computing device to the telephone system by placing a call to the telephone number.

\* \* \* \* \*